US012515259B2

(12) United States Patent
Medeiros-Nicholson et al.

(10) Patent No.: US 12,515,259 B2
(45) Date of Patent: Jan. 6, 2026

(54) CORE DRILL

(71) Applicant: MILWAUKEE ELECTRIC TOOL CORPORATION, Brookfield, WI (US)

(72) Inventors: Andrew T. Medeiros-Nicholson, Wauwatosa, WI (US); Jonathan E. Schmitz, Wauwatosa, WI (US); Terry L. Timmons, Oconomowoc, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 653 days.

(21) Appl. No.: 17/711,633

(22) Filed: Apr. 1, 2022

(65) Prior Publication Data

US 2022/0314426 A1 Oct. 6, 2022

Related U.S. Application Data

(60) Provisional application No. 63/170,084, filed on Apr. 2, 2021.

(51) Int. Cl.
*B23B 31/06* (2006.01)
*B23B 31/11* (2006.01)
(Continued)

(52) U.S. Cl.
CPC .............. *B23B 31/06* (2013.01); *B23B 31/11* (2013.01); *B23B 51/0473* (2013.01);
(Continued)

(58) Field of Classification Search
CPC ......... B23B 2260/09; B23B 2260/138; B23B 31/06; B23B 31/11; B23B 51/04;
(Continued)

(56) References Cited

U.S. PATENT DOCUMENTS

| 1,791,073 A | 2/1931 | Manley |
| 3,456,738 A | 7/1969 | Harry |

(Continued)

FOREIGN PATENT DOCUMENTS

| DE | 2238838 A1 | 2/1974 |
| DE | 2834286 A1 | 3/1979 |

(Continued)

OTHER PUBLICATIONS

EP-1923161-A2 Translation; Miller, Mark, Holesaw Mandrel Assembly, May 21, 2008 (Year: 2008).*

(Continued)

*Primary Examiner* — Sunil K Singh
*Assistant Examiner* — Michael Vitale
(74) *Attorney, Agent, or Firm* — Michael Best & Friedrich LLP (57) ABSTRACT

A bit-removal assembly includes a first ring coupled to an output shaft for co-rotation therewith, a second ring supported on the lower retaining ring of the output shaft, a frusto-conical surface on at least one of the first or second rings, and a wedge positioned between the first and second rings and engaging with the frusto-conical surface. A collar defines a cam surface located radially outward of the wedge. The collar is movable between a locked position, in which the cam surface is engaged with the wedge to displace the wedge radially inward on the frusto-conical surface to separate the second ring from the first ring, and a released position, in which the cam surface is misaligned with the wedge to permit the wedge to move radially outward on the frusto-conical surface. A biasing member urges the collar towards the locked position.

17 Claims, 10 Drawing Sheets

(51) Int. Cl.
*B23B 51/04* (2006.01)
*B25H 1/00* (2006.01)

(52) U.S. Cl.
CPC ........ *B23B 2260/09* (2013.01); *B25H 1/0042* (2013.01); *Y10T 408/907* (2015.01)

(58) Field of Classification Search
CPC .............. B23B 51/0473; B25H 1/0042; Y10T 408/895; Y10T 279/33; Y10T 279/3487; Y10T 408/906; Y10T 408/907
USPC .......................... 408/224, 226; 279/141, 156
See application file for complete search history.

(56) References Cited

U.S. PATENT DOCUMENTS

| | | | |
|---|---|---|---|
| 3,464,655 A | 9/1969 | Schuman | |
| 3,663,115 A | 5/1972 | Vindez et al. | |
| 3,915,241 A | 10/1975 | Bieri | |
| 4,013,133 A | 3/1977 | Bieri | |
| 4,540,149 A | 9/1985 | Rupprecht et al. | |
| 4,582,460 A | 4/1986 | Silverberg et al. | |
| 4,923,344 A | 5/1990 | Bieri | |
| 5,062,746 A | 11/1991 | Deremo | |
| 5,302,045 A | 4/1994 | Johnsen | |
| 5,342,153 A | 8/1994 | Dobkins | |
| 5,558,476 A | 9/1996 | Uchida et al. | |
| 5,794,724 A | 8/1998 | Moller | |
| 5,807,034 A | 9/1998 | Perlmutter et al. | |
| 5,807,038 A | 9/1998 | Skinner | |
| 5,888,031 A | 3/1999 | Buck et al. | |
| 5,899,644 A | 5/1999 | Buck et al. | |
| 6,039,038 A | 3/2000 | Buck et al. | |
| 6,149,364 A | 11/2000 | Maeda | |
| 6,568,876 B2 | 5/2003 | Augustin | |
| 6,692,201 B2 | 2/2004 | Soderman | |
| 6,869,258 B2 | 3/2005 | Flock et al. | |
| 6,887,018 B2 | 5/2005 | Ostermeier | |
| 6,902,347 B2 | 6/2005 | Stolz et al. | |
| 6,932,546 B2 | 8/2005 | Ohlendorf | |
| 7,001,116 B2 | 2/2006 | Kozak | |
| 7,070,366 B2 | 7/2006 | Reichenberger et al. | |
| 7,073,797 B2 | 7/2006 | Gaul | |
| 7,108,459 B1 | 9/2006 | Mueller | |
| 7,219,753 B2 | 5/2007 | Gaul | |
| 7,220,091 B2 | 5/2007 | Takahashi et al. | |
| 7,267,512 B1 | 9/2007 | Mueller | |
| 7,484,578 B2 | 2/2009 | Duncan | |
| 7,658,242 B2 | 2/2010 | Duncan | |
| 7,766,583 B2 | 8/2010 | Kozak | |
| 8,201,548 B2 | 6/2012 | van Taack-Trakranen et al. | |
| 8,245,997 B2 | 8/2012 | Baratta | |
| 8,328,475 B2 | 12/2012 | Naughton et al. | |
| 8,813,588 B2 | 8/2014 | Sattler | |
| 9,061,414 B2 | 6/2015 | Sattler | |
| 9,789,600 B2 | 10/2017 | Jönsson et al. | |
| 10,012,243 B2 | 7/2018 | Li | |
| 10,207,338 B2 | 2/2019 | Reichenberger et al. | |
| 10,350,745 B2 | 7/2019 | Zhang | |
| 10,799,959 B2 | 10/2020 | Carlson et al. | |
| 10,821,525 B2 | 11/2020 | Carlson et al. | |
| 2004/0018063 A1* | 1/2004 | Ostermeier | B23B 51/0473 |
| 2007/0086868 A1 | 4/2007 | Ray | |
| 2007/0217879 A1 | 9/2007 | Larsson | |
| 2009/0136310 A1* | 5/2009 | Naughton | B23B 31/06 |
| 2010/0239381 A1* | 9/2010 | Kelleher | B23B 51/0473 408/204 |
| 2010/0290848 A1 | 11/2010 | Baratta | |
| 2011/0103907 A1* | 5/2011 | Martin | Y10T 408/895 |
| 2015/0352708 A1 | 12/2015 | van Taack-Trakranen | |
| 2015/0360299 A1* | 12/2015 | Beardmore | B23B 2260/138 |
| 2016/0250693 A1* | 9/2016 | Timmons | B23B 51/0426 408/76 |
| 2020/0406373 A1 | 12/2020 | Carlson et al. | |
| 2021/0008647 A1 | 1/2021 | Carlson et al. | |

FOREIGN PATENT DOCUMENTS

| | | | | |
|---|---|---|---|---|
| DE | 3517791 A1 | | 11/1986 | |
| DE | 9002854 U1 | | 5/1990 | |
| DE | 3434260 C2 | | 4/1996 | |
| DE | 29604902 U1 | | 5/1996 | |
| DE | 29505693 U1 | | 7/1996 | |
| DE | 29615091 U1 | | 11/1996 | |
| DE | 29703693 U1 | | 5/1997 | |
| DE | 29802393 U1 | | 6/1998 | |
| DE | 29713139 U1 | | 11/1998 | |
| DE | 10064173 C1 | | 6/2002 | |
| DE | 20301429 U1 | | 6/2003 | |
| DE | 20318946 U1 | | 2/2004 | |
| DE | 19703910 B4 | | 7/2005 | |
| DE | 102004059112 A1 | * | 6/2006 | ........... B23B 31/003 |
| DE | 10325073 B4 | | 1/2015 | |
| DE | 102015105288 A1 | | 10/2016 | |
| EP | 0392390 A2 | | 10/1990 | |
| EP | 0236536 B1 | | 3/1991 | |
| EP | 0791424 B1 | | 6/2003 | |
| EP | 1600259 B1 | | 3/2007 | |
| EP | 2436491 A2 | | 4/2012 | |
| EP | 1923161 B1 | * | 8/2013 | ......... B23B 51/0473 |
| EP | 2818282 B1 | | 8/2016 | |
| EP | 3495080 A1 | | 6/2019 | |
| EP | 3505283 A1 | | 7/2019 | |
| JP | 2005313275 A | | 11/2005 | |
| WO | 2004069501 A2 | | 8/2004 | |
| WO | 2006061291 A1 | | 6/2006 | |
| WO | 2008026975 A1 | | 3/2008 | |
| WO | 2014126525 A1 | | 8/2014 | |
| WO | 2019008132 A1 | | 1/2019 | |
| WO | 2020176023 A1 | | 9/2020 | |

OTHER PUBLICATIONS

International Search Report and Written Opinion for Application No. PCT/US2022/023082 dated Jul. 25, 2022 (11 pages).

* cited by examiner

CORE DRILL

CROSS-REFERENCE TO RELATED APPLICATIONS

This application claims priority to U.S. Provisional Patent Application No. 63/170,084 filed on Apr. 2, 2021, the entire content of which is incorporated herein by reference.

FIELD OF THE INVENTION

The present invention relates a large drill, and more particularly to a core drill.

BACKGROUND OF THE INVENTION

Large drills, such as core drills, typically provide a large amount of torque during operation to rotate a core bit. With the reaction torque on the core bit being equally as large, a core bit may become seized on the chuck of the core drill, which makes removal difficult for the user.

SUMMARY OF THE INVENTION

In one aspect, the invention provides a core drill assembly including a housing, a drive mechanism supported within the housing, an output shaft configured to rotate about a rotational axis in response to torque received from the drive mechanism, the output shaft having a threaded connection to which a core bit is threaded, a lower retaining ring, and an upper retaining shoulder. The core drill assembly also includes a bit-removal assembly coupled to the output shaft between the lower retaining ring and the upper retaining shoulder. The bit-removal assembly includes a first ring coupled to the output shaft for co-rotation therewith, a second ring supported on the lower retaining ring of the output shaft, a frusto-conical surface on at least one of the first or second rings, a wedge positioned between the first and second rings, the wedge being engaged with the frusto-conical surface, and a collar defining a cam surface located radially outward of the wedge. The collar is movable between a locked position, in which the cam surface is engaged with the wedge to displace the wedge radially inward on the frusto-conical surface to separate the second ring from the first ring, and a released position, in which the cam surface is misaligned with the wedge to permit the wedge to move radially outward on the frusto-conical surface. A biasing member is configured to urge the collar towards the locked position.

In another aspect, the invention provides a bit removal assembly configured to be coupled to an output shaft of a power tool. The bit-removal assembly includes a first ring configured to be coupled to the output shaft for co-rotation therewith, a second ring supported on a retaining ring on the output shaft, a frusto-conical surface on at least one of the first or second rings, a wedge positioned between the first and second rings, the wedge being engaged with the frusto-conical surface, and a collar defining a cam surface located radially outward of the wedge. The collar is movable between a locked position, in which the cam surface is engaged with the wedge to displace the wedge radially inward on the frusto-conical surface to separate the second ring from the first ring, and a released position, in which the cam surface is misaligned with the wedge to permit the wedge to move radially outward on the frusto-conical surface. A biasing member is configured to urge the collar towards the locked position.

In yet another aspect, the invention provides a core drill assembly including a housing, a drive mechanism supported within the housing, an output shaft configured to rotate about a rotational axis in response to torque received from the drive mechanism, the output shaft having a threaded connection to which a core bit is threaded, and a bit-removal assembly removably coupled to the output shaft between a lower retaining ring and an upper retaining shoulder. The bit-removal assembly includes a first ring removably coupled to the output shaft for co-rotation therewith, a second ring selectively supported on the lower retaining ring, a frusto-conical surface on at least one of the first or second rings, a wedge positioned between the first and second rings, the wedge being engaged with the frusto-conical surface, and a collar disposed around the wedge. The collar is movable between a locked position, in which the wedge is displaced radially inward on the frusto-conical surface to separate the second ring from the first ring, and a released position, in which the wedge is permitted to move radially outward on the frusto-conical surface. A washer is disposed within the collar and coupled to the collar for co-rotation therewith and a biasing member is positioned between the washer and the first ring. The biasing member is configured to urge the collar towards the locked position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
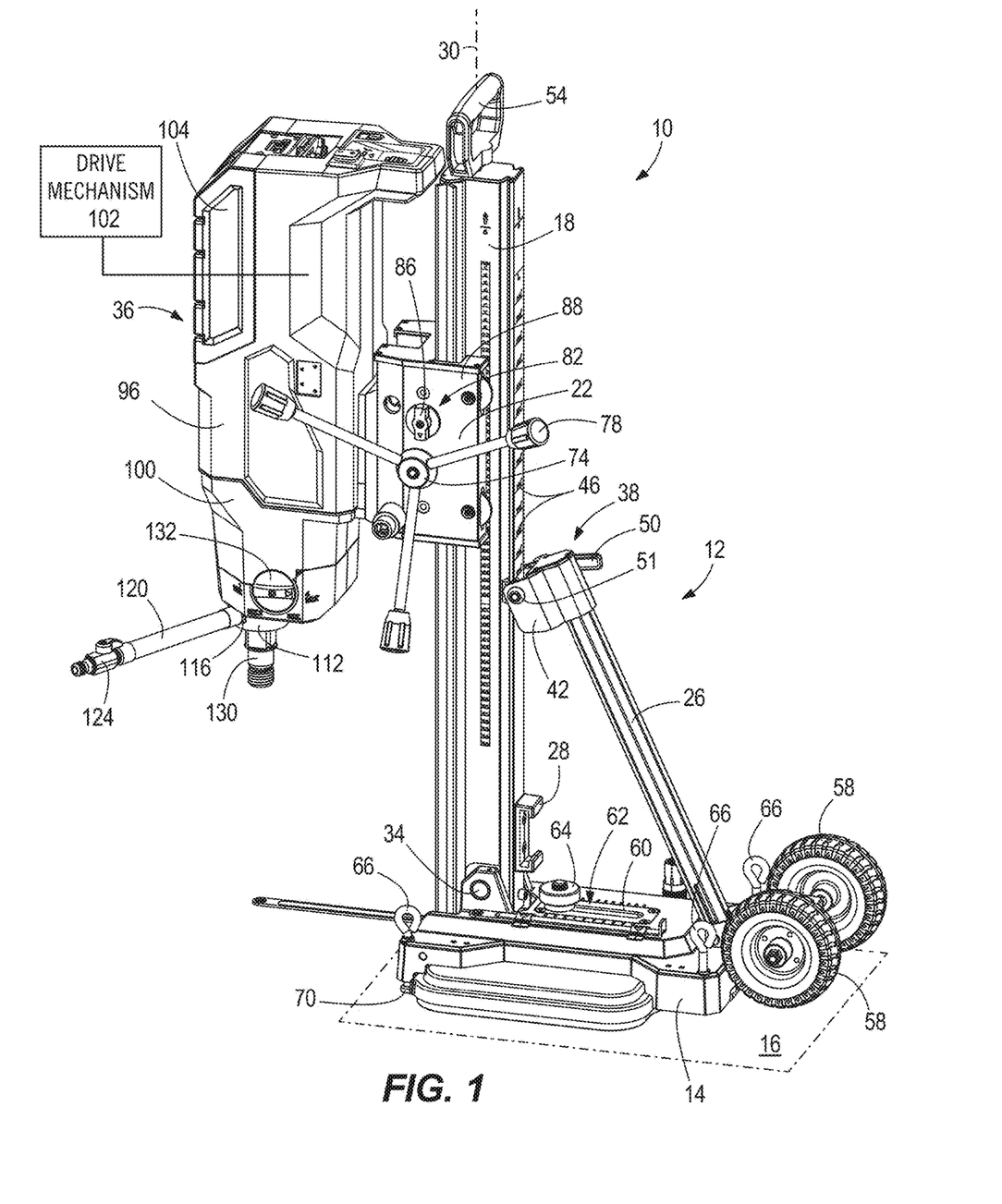
FIG. 1 is a perspective view of a core drill assembly in accordance with an embodiment of the invention, including a core drill and a stand.

FIGS. 1-4 illustrate a core drill assembly 10 including a stand 12 having a base 14 for mounting on a mounting surface 16 that can be vertical (e.g., a wall) or horizontal (e.g., the ground, as shown in FIG. 1). The stand 12 includes a mast 18, a carriage 22 that is movable along the length of the mast 18, and a support bracket 26 moveably coupled to the mast 18 and the base 14. The mast 18 defines a longitudinal axis 30 and is pivotably coupled to the base 14 to pivot about a pivot joint 34. The core drill assembly 10 also includes a core drill 36 mounted to the carriage 22.

The support bracket 26 is moveably coupled to the mast 18 via a tool-free clamping mechanism 38 that selectively locks the support bracket 26 to the mast 18. As shown in FIG. 3, the clamping mechanism 38 includes a pair of clamping arms 42 positioned on respective rails 46 on the mast 18. The rails 46 are parallel with the longitudinal axis 30 of the mast 18. A handle 50 can be rotated to tighten the clamping arms 42 to the rails 46. Specifically, a bolt 51 (FIG. 1) is coupled for rotation with the handle 50. The bolt 51 extends through and is rotatable relative to the clamping arms 42 to selectively lock or unlock the support bracket 26 with respect to the mast 18 so the support bracket 26 is movable between an operational position (FIGS. 1-4) and a stowed position (not shown). When the support bracket 26 is locked with respect to the mast 18, an operator may grasp the support bracket 26 to carry the drill assembly 10.

As shown in FIGS. 1-4, the drill stand 12 includes a battery mount 28 that selectively receives a battery pack. The battery mount 28 is attached to the mast 18 within a space bounded by the mast 18, the support bracket 26, and the base 14. In the illustrated embodiment, the core drill 36 includes a battery pack 104, and the battery mount 28 may be used to store a spare (charged) battery pack ready for the core drill 36 in case the battery pack 104 on the core drill 36 requires recharging. In other embodiments, the battery mount 28 may receive a battery pack that can power the core drill 36. In other embodiments (not shown), the battery mount 28 may be arranged on the support bracket 26 but within the same space bounded by the mast 18, the support bracket 26, and the base 14 to provide protection for the battery pack.

With continued reference to FIGS. 1-4, the stand 12 further includes a handle 54 coupled to a top portion of the mast 18. In the illustrated embodiment, the handle 54 is a D-shaped handle. In some embodiments, the handle 54 may be rotatable about the longitudinal axis 30. The base 14 further includes a pair of wheels 58 coupled to a rear portion of the base 14 to aid with the movement of the drill assembly 10 on the mounting surface 16. The wheels 58 may engage the mounting surface 16 when the base 14 is pivoted relative to the mounting surface 16. For example, the operator may grasp the handle 54 to pivot the base 14 relative to the mounting surface 16 and roll the drill assembly 10 to a desired location on the mounting surface 16 using the wheels 58.

As shown in FIGS. 1-4, the base 14 includes a wear plate 60 having an elongated slot 62 through which a mounting bolt 64 may be inserted to secure the base 14 to the mounting surface 16 by, for example, setting the mounting bolt 64 through the wear plate 60 and into a bore created in the mounting surface 16. The base 14 also includes a plurality of adjusters 66 positioned at each corner of the base 14. The adjusters 66 may be threadably adjusted with respect to the base 14 in order to vertically adjust respective feet 70 attached to the screws 66 with respect to the base 14. In the illustrated embodiment, there are four screws 66, one in each corner of the base 14, but in other embodiments there may be more or fewer screws 66, and the screws may be in different locations on the base 14. The operator may adjust the height and orientation of the base 14 with respect to the mounting surface 16 by adjusting one or more of the screws 66 with respect to the base 14.

Figure 2:
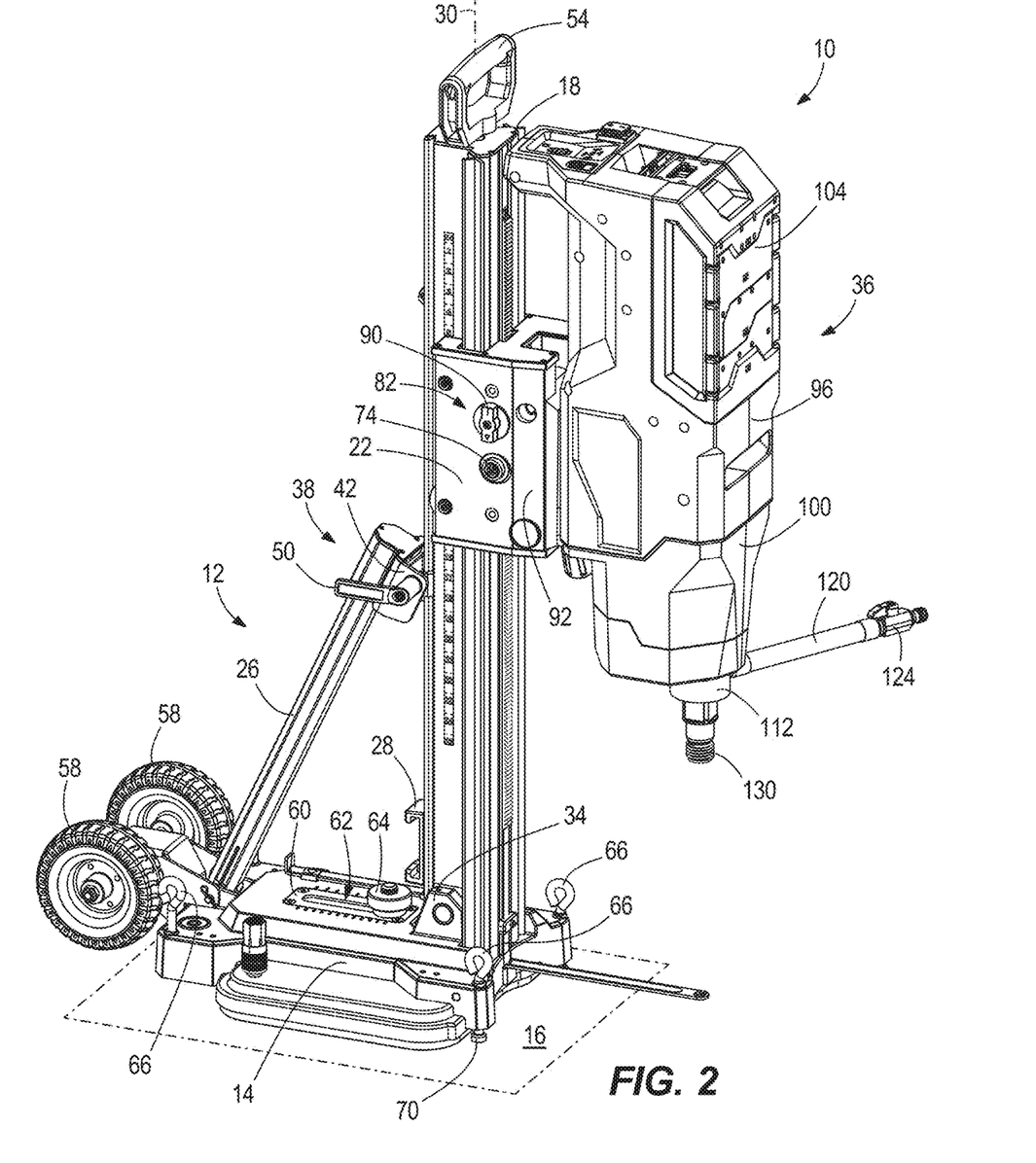
FIG. 2 is another perspective view of the core drill assembly of FIG. 1.
Figure 3:
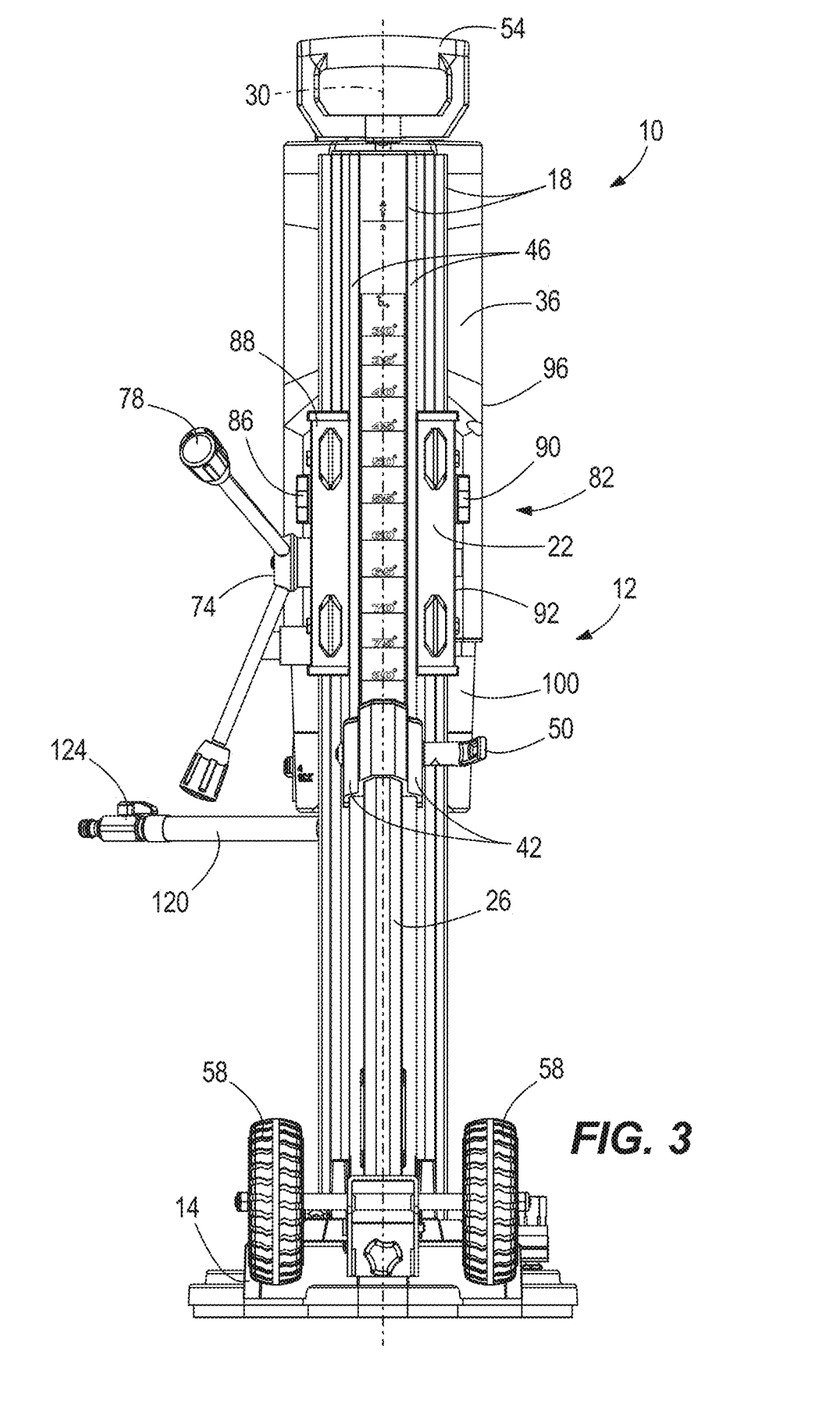
FIG. 3 is a rear view of the core drill assembly of FIG. 1.
Figure 4:
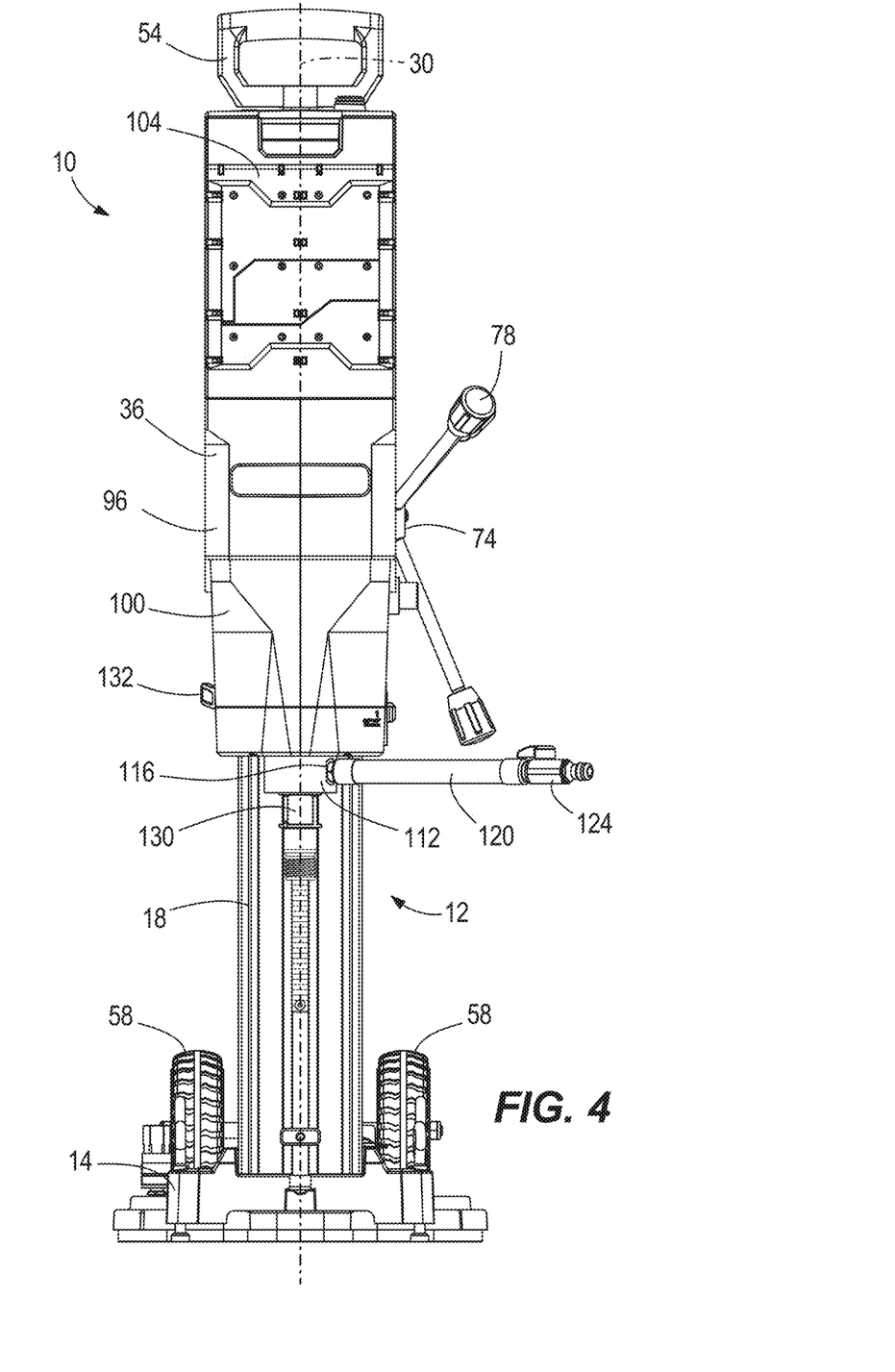
FIG. 4 is a front view of the core drill assembly of FIG. 1.
Figure 5:
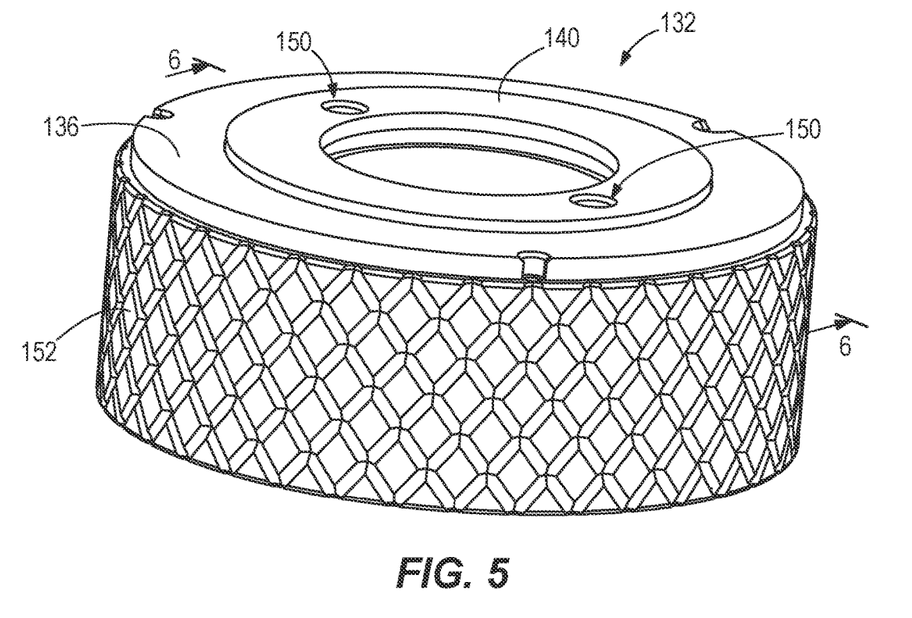
FIG. 5 is a perspective view of a modular bit-removal assembly for use with the core drill assembly of FIG. 1.

As shown in FIGS. 1-3, the carriage 22 includes a spindle assembly 74 for moveably adjusting the carriage 22 along the mast 18, a handle assembly 78 for rotating the spindle assembly 74, and a lock assembly 82 that is operable to secure the carriage 22 in a selected position on the mast 18. The handle assembly 78 can be interchangeably coupled to the spindle assembly 74 on either side of the carriage 22 and is configured to translate the core drill 36 relative to the mast 18. In some embodiments, the spindle assembly 74 may include a brake mechanism that prevents the handle assembly 78 from rotating when the operator is not holding the handle assembly 78. The lock assembly 82 includes a first adjustment dial 86 positioned on a first side 88 (FIG. 1) of the carriage 22 and a second adjustment dial 90 positioned on a second side 92 (FIG. 2) of the carriage 22.

Now with reference to FIG. 1, the core drill 36 includes a main body housing 96, a drive mechanism housing 100 enclosing a drive mechanism 102 (schematically shown in FIG. 1), a battery receptacle formed in the housing 96 that receives the battery pack 104, and an output shaft 108 coupled to the drive mechanism. The output shaft 108 is operable to rotate about a rotational axis in response to torque received from the drive mechanism. The core drill 36 includes a water jacket 112 surrounding the output shaft 108 to supply water to the interior of the output shaft 108 and to a connected core bit 110 (FIGS. 8-10) to abate dust formation during a coring operation. The water jacket 112 includes an inlet 116 that can be operably coupled to a water source (e.g., a hose) for supplying water to the output shaft 108. In the illustrated embodiment, the core drill assembly 10 includes an auxiliary hose 120 having a first end connected to the inlet 116 and an opposite, second end connected to a valve 124, which has a fitting that is connectable to another hose for supplying water to the water jacket 112.

Figure 10:
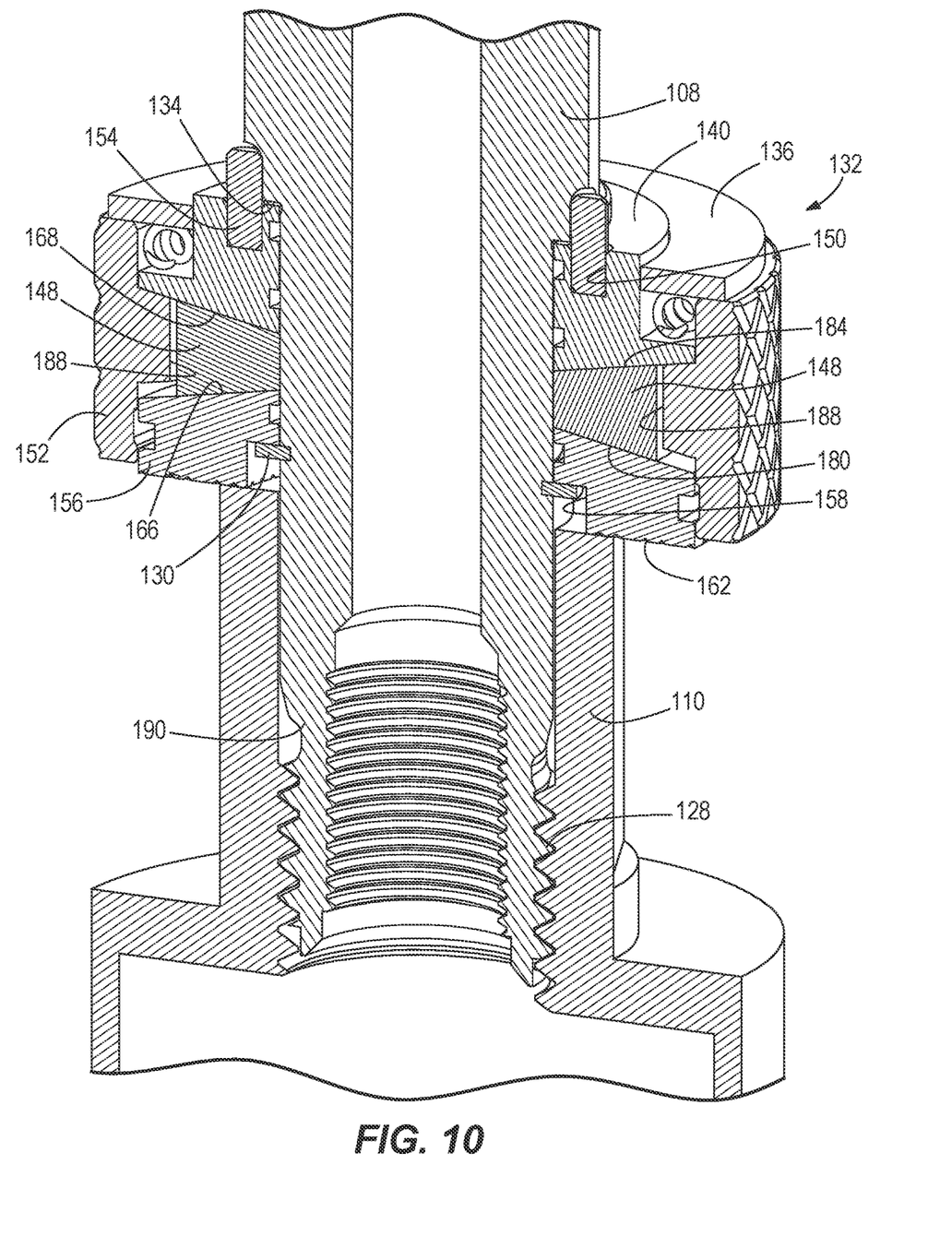
FIG. 10 is a perspective, cross-sectional view of a portion of the core drill of FIG. 1, illustrating the modular bit-removal assembly of FIG. 5 coupled to an output shaft of the core drill and the collar in the locked position.
Figure 11:
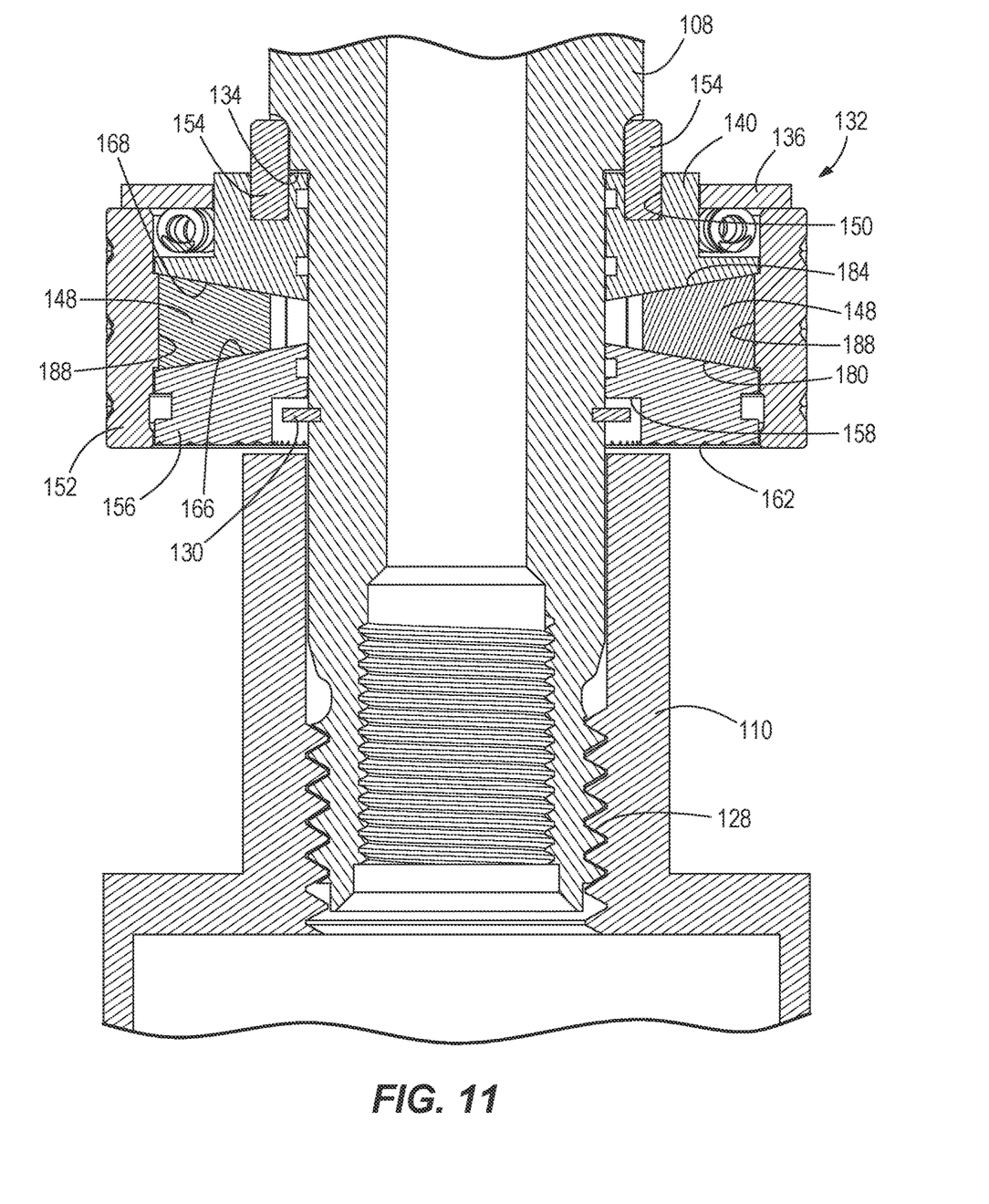
FIG. 11 is a side, cross-sectional view of a portion of the core drill of FIG. 1, illustrating the modular bit-removal assembly of FIG. 5 coupled to an output shaft of the core drill and the collar in a released position.
Figure 12:
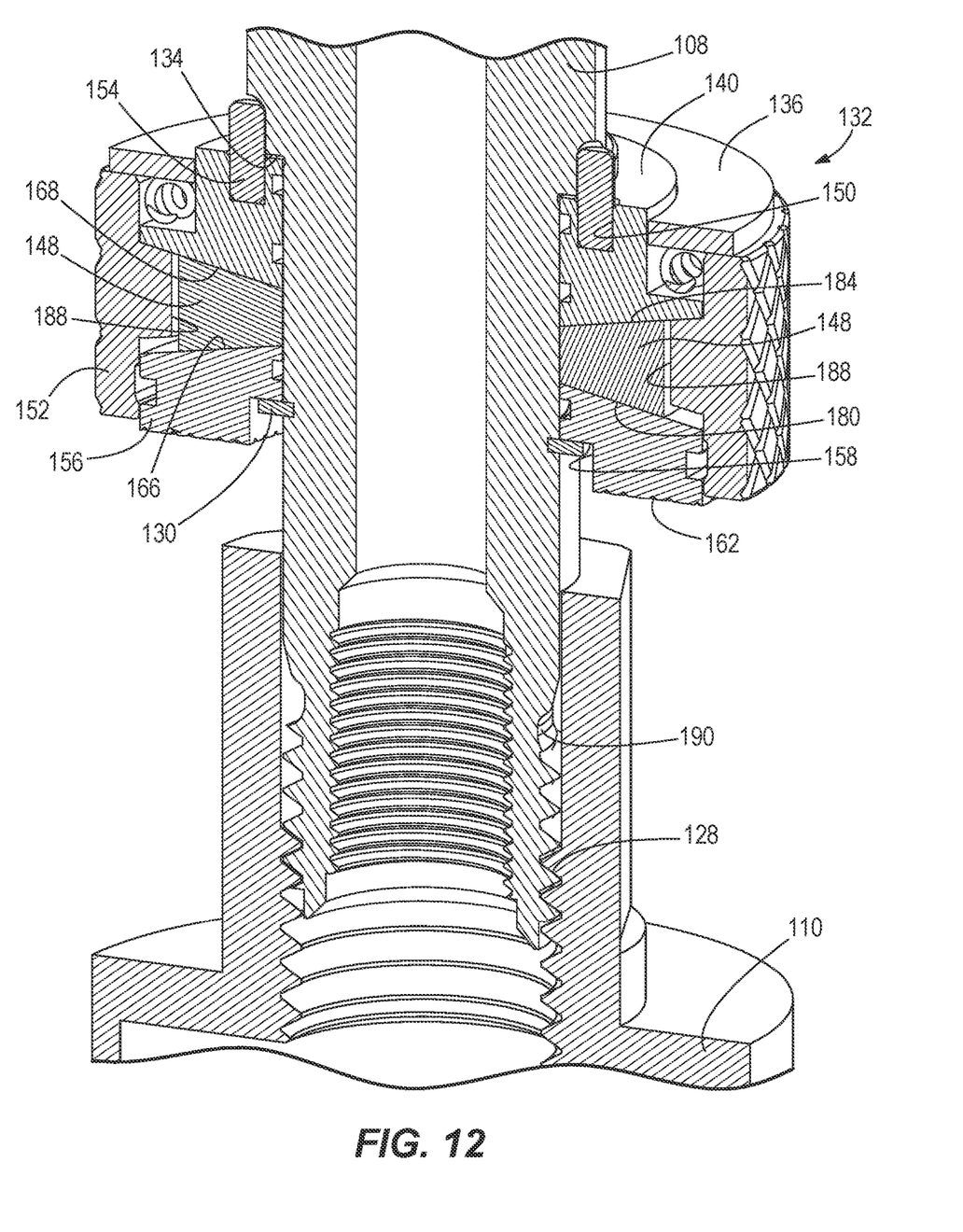
FIG. 12 a perspective, cross-sectional view of a portion of the core drill of FIG. 1, illustrating a core bit being removed from the output shaft of the core drill.

Now with reference to FIGS. 10-12, the output shaft 108 of the core drill 36 includes a threaded connection 128 to which the core bit 110 is threaded. A bit-removal assembly 132 is coupled to the output shaft 108 above the threaded connection 128. In the illustrated embodiment, the bit-removal assembly 132 is supported on the output shaft 108 between a lower retaining ring 130 and an upper retaining shoulder 134 of the output shaft 108. The bit-removal assembly 132 restricts the core bit 110 from threading beyond a desired height (FIG. 10) to prevent the core bit 110 from seizing on the threaded connection 128 of the output shaft 108 during a high-torque event. In the illustrated embodiment, the bit-removal assembly 132 is modular and may be removed from the output shaft 108, if necessary, for repair or replacement. In other words, the bit-removal assembly 132 is not integrally formed on the output shaft 108 of the core drill 36.

Now with reference to FIGS. 5-9, the bit-removal assembly 132 includes an upper washer 136, an upper (first) ring 140 positioned within the upper washer 136, a biasing member 144 positioned between the upper washer 136 and the upper ring 140, a collar 152 coupled for co-rotation with the upper washer 136, a lower ring 156, and a plurality of wedges 148 positioned between the upper and lower rings 140, 156. The upper ring 140 is coupled to the output shaft 108 of the core drill 36 for co-rotation with the output shaft 108 during operation of the core drill 36. In the illustrated embodiment, the upper ring 140 includes a pair of recesses 150 (FIG. 5) that are sized to receive respective pins 154 (FIG. 10), which rotationally affix the upper ring 140 to the output shaft 108. And, the top surface of the upper ring 140 (in which the recesses 150 are formed) is abutted with the upper retaining shoulder 134. The lower ring 156 includes a ledge 158 that engages the lower retaining ring 130 (FIG. 10) of the output shaft 108. As such, the bit-removal assembly 132 is axially captured between the shoulder 134 and the retaining ring 130. The lower ring 156 further includes an engagement surface 162 that engages the core bit 110 to restrict threading of the core bit 110 beyond a desired height on the output shaft 108. In the illustrated embodiment, the engagement surface 162 has a knurled surface that enhances friction between the core bit 110 and the bit-removal assembly 132.

Figure 6:
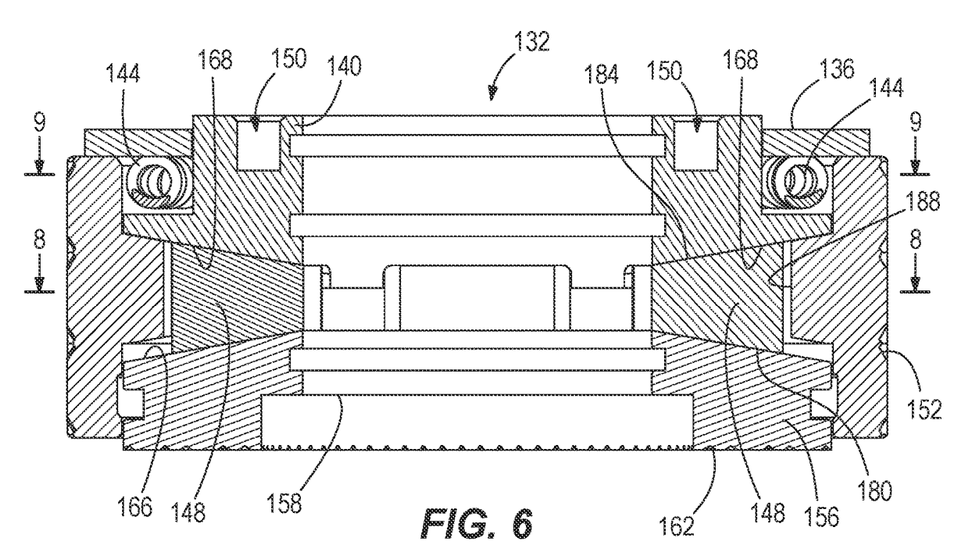
FIG. 6 is a perspective, cross-sectional view of the modular bit-removal assembly of FIG. 5.
Figure 7:
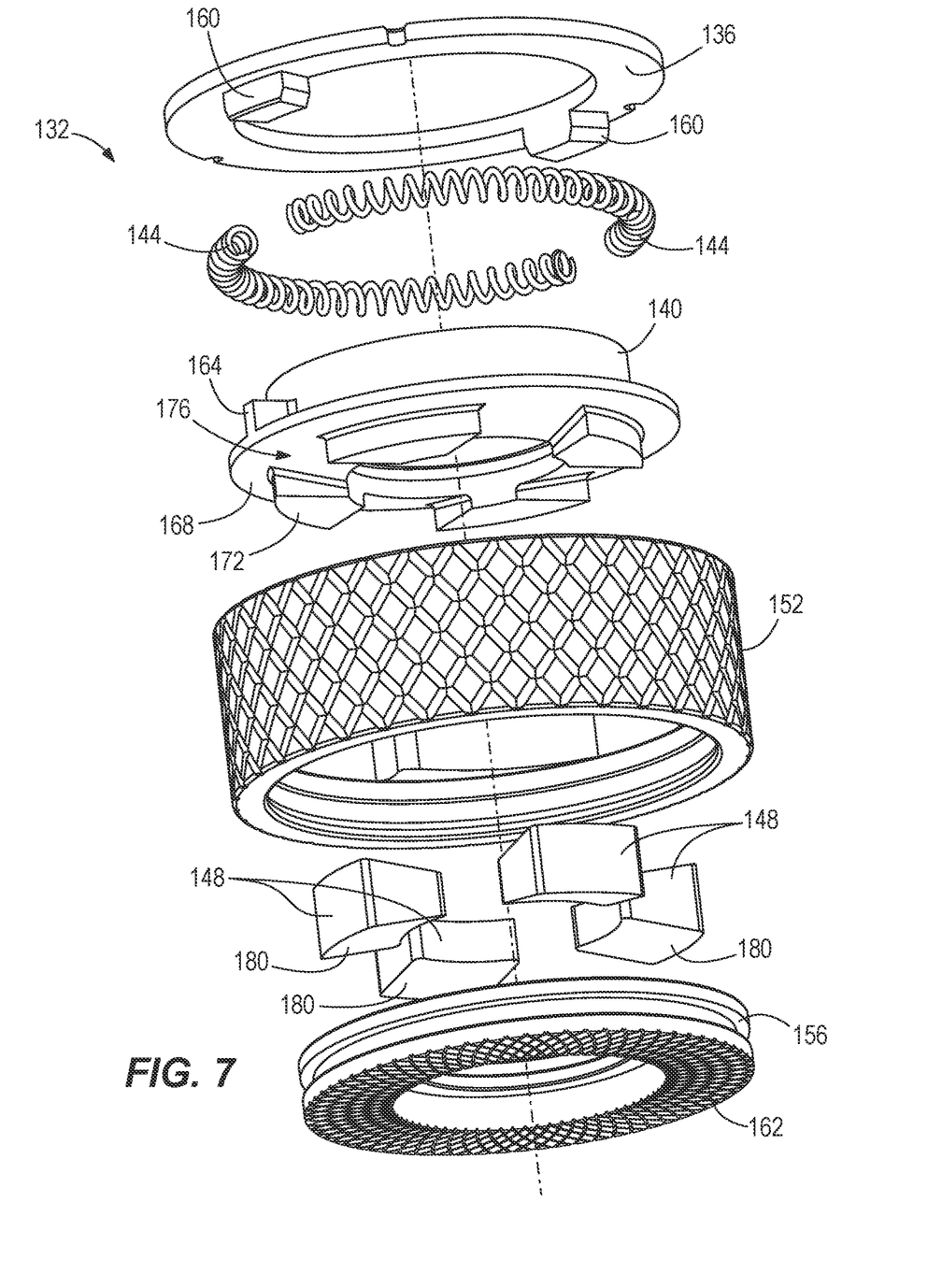
FIG. 7 is an exploded view of the modular bit-removal assembly of FIG. 5.
Figure 9:
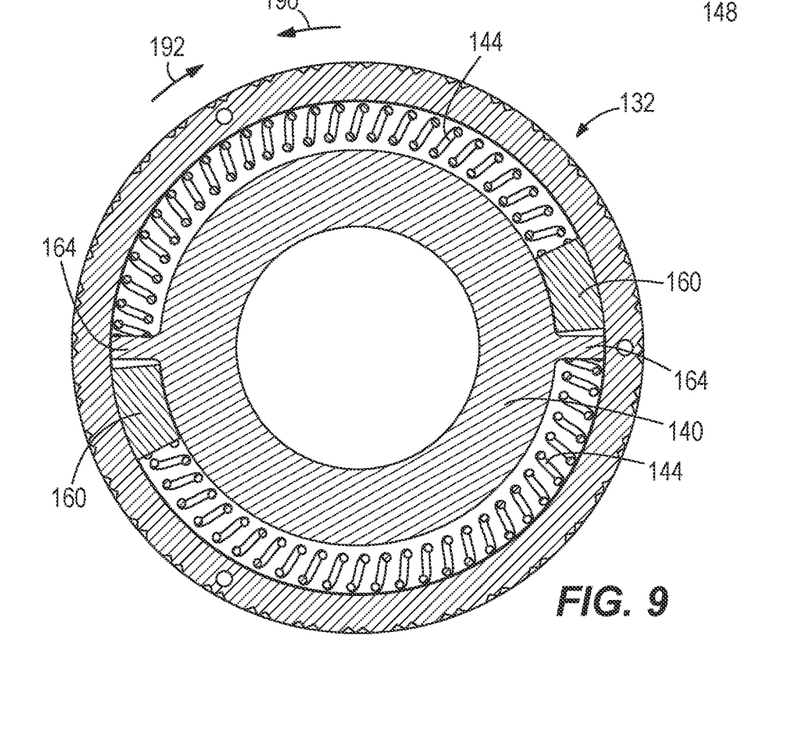
FIG. 9 is a top, partial cutaway view of the modular bit-removal assembly of FIG. 5, illustrating a biasing member that urges the collar towards the locked position.

As illustrated in FIGS. 7 and 9, the upper washer 136 includes a pair of protrusions 160 that move relative to a second pair of protrusions 164 formed on the upper ring 140. In the illustrated embodiment, the upper ring 140 is fixed to the output shaft 108 of the core drill 36 and the upper washer 136 is coupled for co-rotation with the collar 152. The biasing member 144 extends between the protrusions 160 formed on the upper ring 140 and the protrusions 164 formed on the upper washer 136 to urge the collar 152 of the bit-removal assembly 132 towards a locked position, which is further described below (FIGS. 6 and 10). In the illustrated embodiment, the biasing member 144 includes two coil springs that together urge the collar 152 towards the locked position. In other embodiments, the upper washer 136 and the upper ring 140 may be formed as a single structure that is coupled for co-rotation with the output shaft 108 of the core drill 36. In such embodiments, the biasing member 144 may be positioned between the collar 152 and the upper ring 140 to urge the collar 152 towards the locked position.

Figure 8:
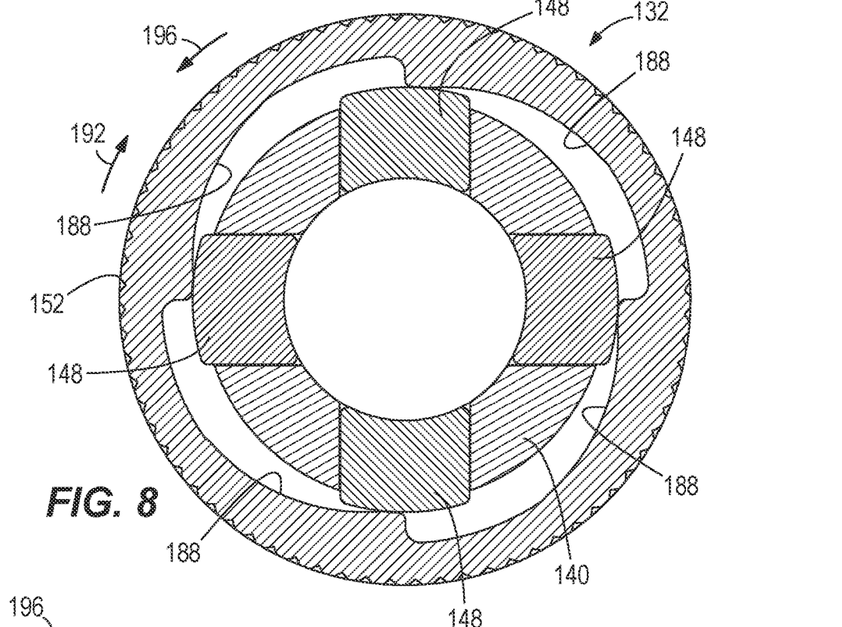
FIG. 8 is a cross-sectional view of the modular bit-removal assembly of FIG. 5 through section line 8-8 in FIG. 6, illustrating a collar of the bit-removal assembly in a locked position.

With continued reference to FIGS. 6-8, the lower ring 156 defines a frusto-conical support surface 166 (FIG. 6) formed on a top portion of the lower ring 156 opposite the engagement surface 162. The upper ring 140 includes an opposing frusto-conical support surface 168 formed on a bottom-facing portion of the upper ring 140 and a second plurality of protrusions 172 (FIG. 7) that extend downward from the support surface 168. The second plurality of protrusions 172 are radially spaced on the support surface 168 to define receiving channels 176 (FIG. 7), which are respectively sized to receive one of the wedges 148. In the illustrated embodiment, the upper ring 140 includes four receiving channels 176, which are each sized to receive one of the wedges 148 (for a total of four wedges). In other embodiments, the bit-removal assembly 132 may include more (e.g., five, six, etc.) or less (e.g., three, two, or one) receiving channels and wedges.

In the illustrated embodiment, the frusto-conical support surface 166 of the lower ring 156 is tapered in a radially outward direction (i.e., the thickness of the lower ring 156 decreases in a radially outward direction) and supports a lower angled surface 180 of the wedge 148. The opposing frusto-conical support surface 168 of the upper ring 140 is also tapered in a radially outward direction (i.e., the thickness of the upper ring 140 decreases in a radially outward direction) and engages a top angled surface 184 of the wedge 148 to locate the wedge 148 within the channel 176. In the illustrated embodiment, the wedges 148 and the receiving channels 176 each have a trapezoidal geometry.

Now with reference to FIG. 8, the collar 152 includes a cam surface 188 that engages the wedges 148 to adjust the radial position of the wedges 148 on the support surface 166 of the lower ring 156. In the illustrated embodiment, the cam surface 188 extends radially inward from an inner surface of the collar 152 in a gradually increasing manner. Rotation of the collar 152 in a first (clockwise) direction 192 causes each wedge 148 to move radially inward (e.g., towards the output shaft 108) on the support surface 166 and towards a locked position (FIGS. 8 and 10). In the illustrated embodiment, the biasing member 144 urges the upper washer 136 and the collar 152 in the first direction 192 and towards the locked position. In the locked position, the cam surface 188 engages with the wedges 148 to displace the wedges 148 radially inward on the frusto-conical support surface 166, which pushes the lower ring 156 away from the upper ring 140. Accordingly, the wedges 148 separate the upper and lower rings 140, 156 such that the bit-removal assembly 132 forms a rigid body. In the locked position of the collar 152, the lower ring 156 may receive a clamping force from the core bit 110 in response to a reaction torque applied to the core bit 110 during a drilling operation, causing the core bit 110 to further tighten on the threaded connection 128 and frictionally engage the engagement surface 162 of the lower ring 156.

Rotation of the collar 152 in a second (counter-clockwise) direction 196 permits each wedge 148 to move radially outward (e.g., away from the output shaft 108) on the support surface 166 and towards a released position (FIG. 11). In the illustrated embodiment, the co-rotation of the collar 152 and the upper washer 136 in the second direction 196 causes the protrusion 160 of the upper washer 136 to move towards the opposing protrusion 164 of the upper ring 140, which compresses the biasing member 144. As the biasing member 144 compresses, the cam surfaces 188 on the collar 152 become rotationally misaligned with the wedges 148, permitting them to move radially outward along the support surface 166 of the lower ring 156. In the released position, the cam surface 188 is misaligned with the wedge 148 to permit the wedge 148 to move radially outward on the frusto-conical support surface 166, which releases the clamping force against the lower ring 156 from the core bit 110 to permit unthreading of the core bit 110 from the output shaft 108. After the collar 152 is released by the user, the biasing member 144 urges the collar 152 back towards the locked position (FIGS. 8 and 10).

Now with reference to FIG. 10-12, when the core bit 110 is threaded to the threaded connection 128, the top surface of the core bit 110 contacts the engagement surface 162 of the lower ring 156 (FIG. 10) prior to an uppermost thread 190 on the core bit 110 reaching the end of the threaded connection 128. In the locked position, the wedges 148 restrict upward movement of the lower ring 156 on the output shaft 108. This also prevents the uppermost thread on the core bit 110 from reaching the end of the threaded connection 128 that might otherwise cause the core bit 110 to seize on the output shaft 108 after being subject to a large reaction torque during a coring operation.

To remove the core bit 110 after a coring operation, the collar 152 is rotated in the second direction 196 (FIG. 8), which rotationally misaligns the cam surfaces 188 with the respective wedges 148 and compresses the biasing member 144. With the cam surfaces 188 being rotationally misaligned with the wedges 148, the wedges 148 may be displaced radially outward (FIG. 11) along the support surface 166 and towards the released position. With the wedges 148 in their radially outward position of FIG. 11, the clamping force formerly applied to the lower ring 156 and the core bit 110 by the wedges 148 is also released, permitting the lower ring 156 and the core bit 110 to be rotated relative to the output shaft 108, which allows the core bit 110 to begin to unthread from the output shaft 108. After a gap is created between the core bit 110 and the lower ring 156 (FIG. 11), the core bit 110 may be easily removed from the output shaft 108 (FIG. 12) without any frictional resistance being applied. Therefore, the core bit 110 can be removed from the output shaft 108, even after a high-torque event, by hand without the use of tools.

Various features of the invention are set forth in the following claims.

What is claimed is:

1. A core drill comprising:
   a housing;
   an output shaft configured to rotate about a rotational axis, the output shaft having a threaded connection to which a core bit is threaded, a lower retaining ring, and an upper retaining shoulder; and
   a bit-removal assembly coupled to the output shaft between the lower retaining ring and the upper retaining shoulder, the bit-removal assembly including:
      a first ring coupled to the output shaft for co-rotation therewith,
      a second ring supported on the lower retaining ring of the output shaft,
      a frusto-conical surface on at least one of the first or second rings,
      a wedge positioned between the first and second rings, the wedge being engaged with the frusto-conical surface,
      a collar defining a cam surface located radially outward of the wedge, the collar being movable between a locked position, in which the cam surface is in direct contact with the wedge to displace the wedge radially inward on the frusto-conical surface to separate the second ring from the first ring, and a released position, in which the cam surface is misaligned with the wedge to permit the wedge to move radially outward on the frusto-conical surface,
      a biasing member configured to urge the collar towards the locked position, and
      a washer coupled to the collar for co-rotation therewith,
      wherein the biasing member extends between a first protrusion formed on the first ring and a second protrusion formed on the washer, and
      moving the collar toward the released position moves the first protrusion toward the second protrusion to compress the biasing member.

2. The core drill of claim 1, wherein the second ring includes an engagement surface that engages the core bit to restrict threading of the core bit beyond a desired height on the output shaft when the collar is in the locked position.

3. The core drill of claim 2, wherein the engagement surface of the second ring has a knurled surface that increases friction between the engagement surface and the core bit.

4. The core drill of claim 2, wherein
   the frusto-conical surface is a first frusto-conical surface formed on a bottom-facing portion of the first ring, and
   the second ring includes a second frusto-conical support surface formed on a top portion of the second ring opposite the engagement surface.

5. The core drill of claim 1, wherein the bit-removal assembly is modular and removable from the output shaft.

6. The core drill of claim 5, wherein the first ring includes a pair of recesses that are sized to receive respective pins that couple the first ring to the output shaft.

7. A bit-removal assembly configured to be coupled to an output shaft of a power tool, the bit-removal assembly comprising:
   a first ring configured to be coupled to the output shaft for co-rotation therewith;
   a second ring supported on a retaining ring, the retaining ring coupled to the output shaft;
   a frusto-conical surface on at least one of the first or second rings;
   a wedge positioned between the first and second rings, the wedge being engaged with the frusto-conical surface;
   a collar defining a cam surface located radially outward of the wedge, the collar being movable between a locked position, in which the cam surface is in direct contact with the wedge to displace the wedge radially inward on the frusto-conical surface to separate the second ring from the first ring, and a released position, in which the cam surface is misaligned with the wedge to permit the wedge to move radially outward on the frusto-conical surface;
   a biasing member configured to urge the collar towards the locked position; and
   a washer coupled to the collar for co-rotation therewith,
   wherein the biasing member extends between a first protrusion formed on the first ring and a second protrusion formed on the washer, and
   moving the collar toward the released position moves the first protrusion toward the second protrusion to compress the biasing member.

8. The bit-removal assembly of claim 7, wherein
   the frusto-conical surface is a first frusto-conical surface formed on a bottom-facing portion of the first ring, and
   the second ring includes a second frusto-conical support surface formed on a top portion of the second ring.

9. The bit-removal assembly of claim 7, wherein the first ring further includes a plurality of protrusions spaced circumferentially apart from one another to define a channel, and wherein the wedge slidably engages and is received by the channel.

10. The bit-removal assembly of claim 9, wherein both the channel and the wedge have a trapezoidal geometry.

11. The bit-removal assembly of claim 7, wherein the frusto-conical surface tapers outwardly in a radially outward direction.

12. A core drill comprising:
   a housing;
   an output shaft configured to rotate about a rotational axis, the output shaft having a threaded connection to which a core bit is threaded; and
   a bit-removal assembly removably coupled to the output shaft between a lower retaining ring and an upper retaining shoulder, the bit-removal assembly including:
      a first ring removably coupled to the output shaft for co-rotation therewith,
      a second ring selectively supported on the lower retaining ring,
      a frusto-conical surface on at least one of the first or second rings,
      a wedge positioned between the first and second rings, the wedge being engaged with the frusto-conical surface, a collar defining a cam surface located radially outward of the wedge, the collar being movable between a locked position, in which the cam surface is in direct contact with the wedge to displace the wedge radially inward on the frusto-conical surface to separate the second ring from the first ring, and a released position, in which the cam surface is misaligned with the wedge to permit the wedge to move radially outward on the frusto-conical surface, a washer disposed within the collar and coupled to the collar for co-rotation therewith, and a biasing member positioned between the washer and the first ring, the biasing member configured to urge the collar towards the locked position, wherein the biasing member extends between a first protrusion formed on the first ring and a second protrusion formed on the washer, and moving the collar toward the released position moves the first protrusion toward the second protrusion to compress the biasing member.

13. The core drill of claim 12, wherein the second ring of the bit-removal assembly includes a ledge that engages the lower retaining ring when the bit-removal assembly is coupled to the output shaft.

14. The core drill of claim 12, wherein the first ring abuts the upper retaining shoulder when the bit-removal assembly is coupled to the output shaft.

15. The core drill of claim 12, wherein the second ring includes an engagement surface that engages the core bit to restrict threading of the core bit beyond a desired height on the output shaft when the collar is in the locked position.

16. The core drill of claim 15, wherein the engagement surface of the second ring has a knurled surface that increases friction between the engagement surface and the core bit.

17. The core drill of claim 15, wherein
 the frusto-conical surface is a first frusto-conical surface formed on a top portion of the second ring opposite the engagement surface, and
 the first ring includes a second frusto-conical support surface formed on a bottom-facing portion.

* * * * *